June 20, 1967  J. L. ANDERSON  3,326,413
DISPENSING BREAD BOX
Filed Sept. 20, 1965  2 Sheets-Sheet 2
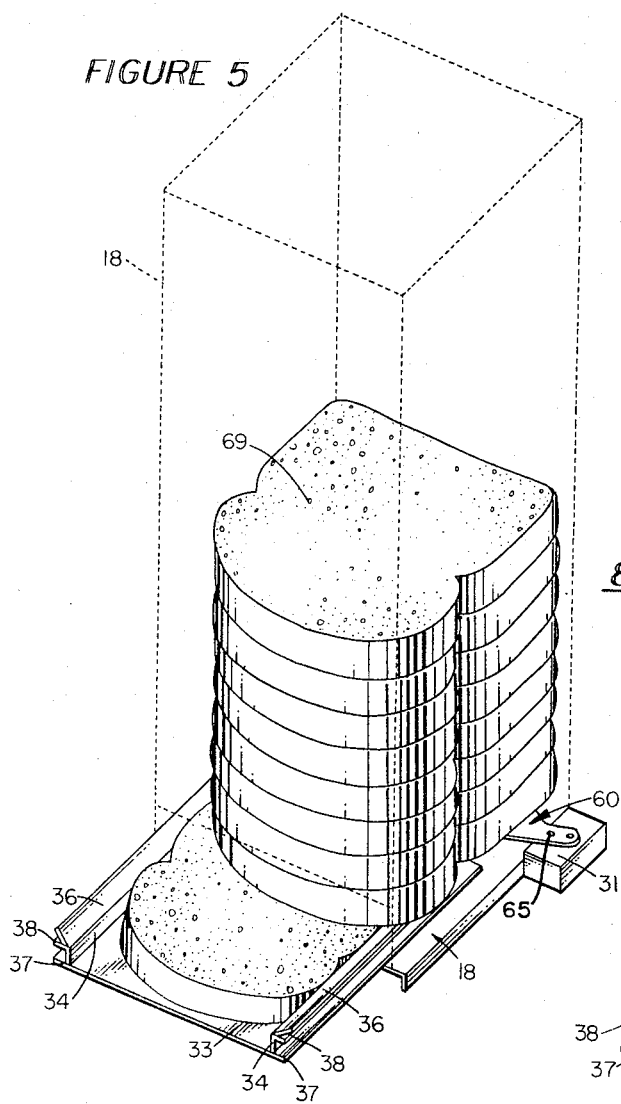
FIGURE 5
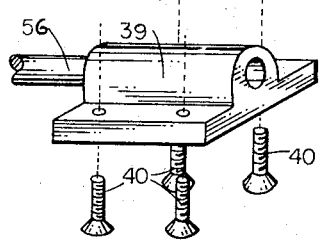
FIGURE 6
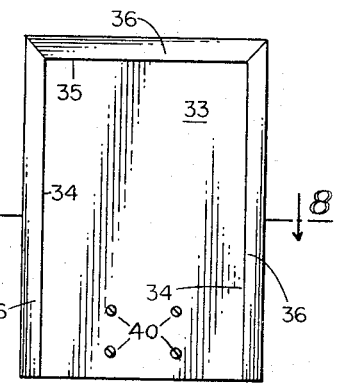
FIGURE 7
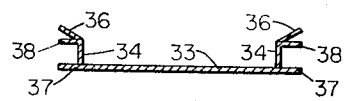
FIGURE 8
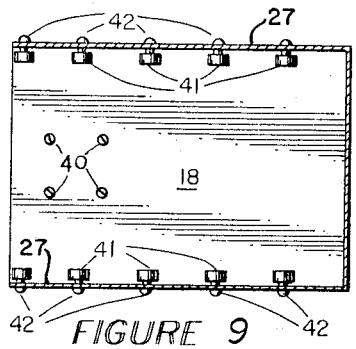
FIGURE 9
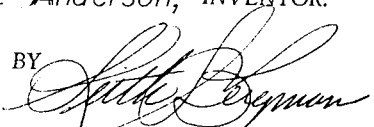
Jeffrey L. Anderson, INVENTOR.
BY
ATTORNEY United States Patent Office 3,326,413
Patented June 20, 1967

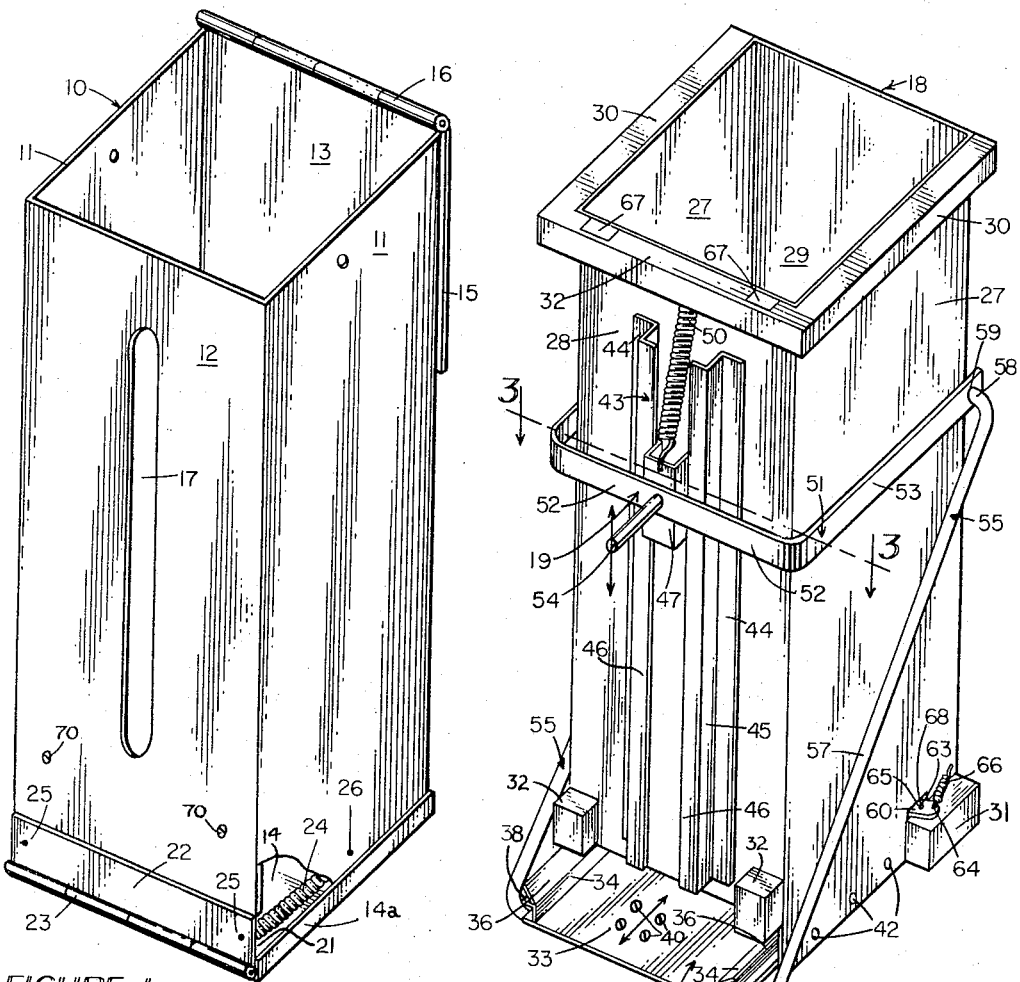
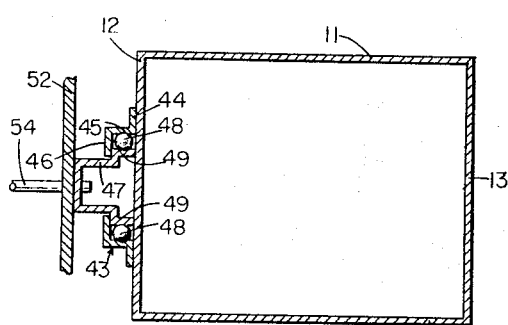
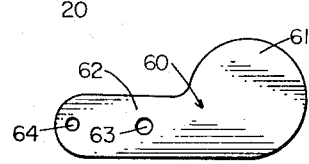

3,326,413
DISPENSING BREAD BOX
Jeffrey L. Anderson, Potlatch, Idaho 83855
Filed Sept. 20, 1965, Ser. No. 488,476
3 Claims. (Cl. 221—250)

This invention relates generally to a container for sliced bread, commonly known as a bread box, and more particularly to such a device that dispenses a single slice of bread upon appropriate manual manipulation.

Bread is most palatable for human consumption in a fresh state, as nearly as possible approximating its condition immediately after baking. The chief factor producing degenerative change is surrounding atmosphere that causes loss of moisture and oxidation as well as bringing to the bread various contaminants. Because of this, it has become common to store bread in containers that more or less cut off the flow of air around the bread to prevent or at least alleviate this problem.

Bread also for convenience is most commonly sliced, in the manufacturing process, into pieces readily manipulated and eaten. This slicing further enhances the deterioration process by exposure of a greater surface area of the bread and is something that must be additionally dealt with in regard to storage to provide appropriate physical support and constraint for the sliced loaf. The nature of the bread itself provides rather ideal host conditions for many contaminants present in its surroundings, either from the air or handlers, and because of this, it is desirable that the bread be handled as little as possible between its manufacture and its ultimate consumption.

With this background and these factors in mind the instant invention seeks to provide a device that serves to contain sliced bread and prevent its deterioration, as an ordinary bread box, but yet upon appropriate manual manipulation serves to dispense the bread and present individual slices in accessible fashion, conveniently, and without the possibility of contamination from handlers. To accomplish these ends:

It is a principal object of my invention to provide a dispensing bread box that upon manual manipulation moves a single slice of bread from a container to an accessible position without manual touching of the bread in the process.

It is a further object of my invention to provide a bread dispenser of the nature aforesaid that serves the function of a bread box in preventing a free circulation of air about the stored loaf and in preventing deleterious substances of various sorts from becoming associated with the bread.

It is a further object of my invention to provide a bread dispenser of the nature aforesaid that may be readily operated with one hand to allow bread to be dispensed by an operator when one hand is otherwise occupied.

It is a still further object of my invention to provide a bread dispenser of the nature aforesaid that maintains a whole loaf of sliced bread in operable position without causing any physical damage thereto.

It is a still further object of my invention to provide a device of the nature aforesaid that is of new and novel design, of economic and durable manufacture, and of great and varied use.

Other and further objects of my invention will be understood from a reading of this application, including its appended specification, drawings and claims.

In the accompanying drawings which form a part of this application, and wherein like numbers of reference refer to similar parts throughout:

FIGURE 1 is an isometric view of the outer case of my invention with part cutaway to completely show its structure, configuration and operation.

FIGURE 2 is an isometric surface view of the internal case carrying the dispensing mechanism of my invention, showing its detailed configuration and structure.

FIGURE 3 is an orthographic cross-sectional view of the internal dispensing case of FIGURE 2, taken on the line 3—3 thereon in the direction indicated by the arrows.

FIGURE 4 is a slightly enlarged, orthographic plan view of the slice-holding dog of my invention, showing its configuration.

FIGURE 5 is an isometric view of several slices of bread resting above the dispensing tray of my invention with the upper part of the internal chamber cut away and shown in only dotted outline so that the operation of my invention may be more clearly shown.

FIGURE 6 is an expanded, isometric view, somewhat enlarged, of the means of fastening the motion transmitting rod to the underside of the dispensing tray.

FIGURE 7 is an orthographic planar view, looking down, upon the dispensing tray of my invention.

FIGURE 8 is a vertical, orthographic, cross-sectional view of the dispensing tray of FIGURE 7, taken on the line 8—8 thereon in the direction indicated by the arrows.

FIGURE 9 is an orthographic planar view, looking downwardly, upon the lower portion of the inner case of my invention, showing the roller structure that carries the dispensing tray.

Referring now to the drawings in more detail and particularly to those of FIGURES 1 and 2, it will there be seen that my invention comprises essentially the outer case 10 removably carrying within it the inner case 18 having slide mechanism 19 and dispensing tray 20.

The outer case 10 is a rectangular box-like member formed from the structural joinder of the two similar side pieces 11, front member 12 and back 13. Bottom member 14 is preferably rigidly attached by its overlapping lip 14a and the top member 15 pivotably attached by the piano hinge 16. Front member 12 is provided with elongate, centrally positioned slot 17 to accommodate the dispensing handle through its course of motion. The lower portion of front 12 is provided with slot 21 to allow passage of a slice of bread in dispensing tray 20; this slot is covered by bread door 22 pivotably mounted along its lower edge by piano hinge 23 rigidly communicating with the forward edge of bottom member 14. Bread door 22 is biased to a normally closed position by spring 24 communicating by fastener 25 with the rearward part of bread door 22 and by fastener 26 with the lateral portion of side member 11.

Inner case 18 is a box-like structure with side walls 27, front panel 28 and rear panel 29 all appropriately sized and shaped so that the completed inner case structure will workably fit within outer case member 10. Since there must be room between the inner case and the outer case for operating mechanism, filler 30 is provided about the top edge of inner case 18 to provide a spaced fit between the members 10, 18; similar spacing blocks 31 are provided on the lower rearward corners of side walls 27 and forward blocks 32 are provided on the inside of forward wall 28 immediately above the dispensing tray slot. These filler blocks maintain structural contact between inner and outer members and provide a means for releasably fastening them, but yet maintain the spaced relationship necessary for operation.

Dispensing tray 20 is the rectangular structure illustrated particularly in FIGURE 7, with bottom 33 structurally communicating with side wall members 34 and rear member 35. The upper portion of side and rear walls 34, 35 is provided with outwardly flaring, inwardly sloping rim 36 to direct a slice of bread thereabove to and upon bottom member 33. Internal dimensions of the dispensing tray should be such as to accommodate the normal size slices of bread of commerce. Side members 34 of the dispensing tray are formed as illustrated in FIGURE 8 with the U-shaped channels between lateral extension 37 of bottom 33 and upper laterally extending lips 38 of side members 34 to support this member upon the rollers carried by inner case 18.

The lower central portion of dispensing tray 20 is provided with dispenser rod housing 39 adapted to rotatably receive the dispenser rod 55. This member, shown in detail in FIGURE 6, is structurally attached to the lower central portion of the bottom 33 of dispensing tray 20 by means of sunken headed studs 40 threadedly engaged through bottom 33 of the dispensing tray into the flanges of the dispenser rod housing 39, as illustrated.

The lower part of side walls 27 carry rollers 41 slidably mounting dispensing tray 20 within the lower part of the inner case 18. Rollers 41 are rotatably carried on stud shafts formed upon the end parts of inwardly projecting bolts 42, structurally carried by the lower part of side walls 27 of inner case 18 as illustrated. Rollers 41 are appropriately positioned to carry dispensing tray 20 immediately above the bottom 33 of inner case 18, in a slideable relation therewith.

Slide mechanism 19 is carried upon outside of front panel 28 of inner case 18 by paired opposed channels 43. Each channel member is shaped substantially as illustrated, with laterally extending fastening arm 44, forwardly projecting middle member 45, and inwardly projecting, channel forming leg 46. These members are preferably rigidly attached in paired, opposed fashion illustrated by fastening arms 44 to the forward surface of forward panel 28 by riveting or welding. Within the channel formed between the two opposed members is carried slide 47, preferably provided with ball bearings 48 between it and inwardly facing sides 45 of the channel 43 to provide for smooth and easy motion. Slide 47 is of the cross-sectional shape illustrated in FIGURE 3, with lateral projections 49 adapted to slideably maintain the member within the channel between channel members 43. Slide 47 is biased to a normally upward position by means of extension spring 50 communicating from the slide to the upper part of front panel 28.

Slide arm 51 is a U-shaped member, as illustrated in FIGURE 2, with forward or middle body 52 structurally communicating with paired opposed, rearwardly extending side legs 53. Slide arm 51 is maintained in the position illustrated in FIGURE 3 upon the slide 47, preferably releasably for ease of assembly, by the activating rod 54 threadedly engaged through the central part of slide arm body 52 and into the medial part of slide 47.

Dispenser rod 55 is an elongate, cylindrical member formed into the U-shape illustrated in FIGURE 2 with central body or tray part 56 communicating with legs 57 which terminate in the inwardly turned ears 58 adapted to rotatably communicate with appropriate holes 59 in the rearward part of laterally extending legs 53 of slide arm 51.

From the structure taught, it will be noted that as activating rod 54 is moved vertically downward, motion will be transmitted through dispenser rod 55 to dispensing tray 20 causing the tray to move outward from the case at right angles to the motion applied to the activating rod 54.

Catching dogs 60 are shaped according to the drawing of FIGURE 4 with enlarged bread-engaging portion 61 communicating with motion arm 62 having pivot support hole 63, and spring hole 64. This member is pivotably mounted upon the upper surface of filler 31, upon stud shaft 65 carried therein, and extends into the inner chamber of inner case 18 through slot 68 therein. Dog 60 is biased by extension spring 66 to the normally inwardly extended position as shown in FIGURE 2. This device extends to prohibit slices of bread carried within the inner container 18 from falling downwardly when tray 20 is withdrawn, but will be contacted by the tray on its return trip and forced inwardly to a non-extended position to allow a single slice of bread to again come into the tray.

Appropriate means may be provided, if desired, to maintain top 15 in a releasably biased closed position over the top opening of the outer case 10. This may be done by many of the commercial varieties of catches or if desired, especially when the case be made from stainless steel or other magnetically permeable material, by means of small permanent magnets 67 appropriately carried in the filler 30.

In operation my invention is assembled according to the teachings aforesaid with inner case 18 secured within outer case 10. This may be accomplished from the construction, as described, or the joinder may be made more secure by means of studs or screws 70 between the members, especially where communicating in adjacent relationship to fillers. In assembly the activating rod 54 can be removed until the inner case 18 is positioned within the outer case 10 and then established within the slot 17 in the position it normally occupies.

A loaf of sliced bread is then inserted in the assembled device, within the upper opening of the inner case 18 and the top 15 replaced to close the outer case. It is to be noted that the dispensing tray 20 will now be in a normally non-extended position and the catching dog 60 will be non-extended so that the bottom slice of bread will drop into the dispensing tray, covering its bottom 33. The dispenser is then activated by manually moving the activating rod 54 vertically downward and this motion will be transmitted through slide arm 51 and dispenser rod 55 to the dispensing tray 20 causing it to move forward at right angles to the motion of the activating rod 54. The dispensing tray will open the normally closed bread door 22 and thus allow the tray to proceed forward until the slice of bread carried thereby is displayed for ready access by the operator. As the dispensing tray 20 moves forward, it allows the inwardly biased catching dog 60 to move inwardly to hold the rearward portion of the next slice of bread immediately above that in the dispensing tray 20, so that it will not fall down and block the inward return movement of the tray. The forward portion of this slice of bread will be held upwardly by the rearward portion of the dispensing tray 20. When the slice of bread is removed from the dispensing tray, the activating rod is released and by reason of the upward spring bias of the slide member 47, the tray will be moved inwardly and the slide will move back to its normally biased closed position, thus completing the cycle.

It is to be noted that bread stored in the device is completely enclosed from ready access from surrounding air or contaminants carried thereby or therethrough. It is further to be noted that the bread need not be touched until its removal from the dispensing tray, as it may be inserted initially by means of a wrapper, without hands coming into contact with it.

The foregoing description of my invention is necessarily of a detailed, particular character so that a specific embodiment of it may be set forth as required by law, but it is to be understood that various modifications, changes and multiplications and substitution of parts may be made without departing from its spirit, essence or scope.

Having thusly described my invention, what I claim is:
1. A dispensing bread box of the nature aforesaid comprising, in combination:
   a box-like outer case having a pivotably mounted lid adapted to form an openable closure therein, with an elongate slot in the front panel adapted to moveably receive an activating arm, and a tray slot in the lower forward portion of said front panel covered by a spring biased, normally closed, bread door adapted to open upon application of outwardly directed force;

a similar inner case with open top and tray slot in the lower front panel thereof adapted to vertically contain a loaf of sliced bread and fit at a spaced distance within said outer case, said inner case having a plurality of spaced rollers opposedly aligned on the lower inside of its side members to slideably support a dispensing tray therebetween;

a dispensing tray adapted to carry a slice of bread carried in the lower part of said inner case, slideably extendable through said tray slot and between said rollers;

a bread holding means including at least one inwardly extending, pivotably mounted dog biased to an inward extended position but moveable to a non-extended position by said dispensing tray, and a slide mechanism, including a slide member carried within a vertically oriented channel on the front of said inner case and within said outer case, said slide being biased to a normally upward position and carrying an activating arm, operatively communicating through said outside case, having rearwardly extending slide arms rotatably communicating in their rearward part with a dispenser rod which in turn communicates rotatably with the lower forward part of said dispensing tray so that when said activating arm be moved downwardly, said dispensing tray will move forwardly to partially extend without said inner and outer cases.

2. In a dispensing bread box of the type having an openable outer case with a similar inner case adapted to vertically contain a loaf of sliced bread, in a spaced relationship therein, with dispensing tray slots in the lower front panels of each said cases, the combination of:

a dispensing tray adapted to contain a slice of bread and having lateral side channels rollably carried upon a plurality of spaced aligned rollers on the opposed lower inner side panels of said inner case, moveable through said tray slots in both said cases, and a slide mechanism operably communicating with said tray including a slide member carried with a vertically oriented channel on the front of said inner case and within said outer case, said slide being downwardly moveable and biased to a normally upward position and having communicating therewith an activating arm operatively extending through said outer case and a slide arm with lateral rearwardly extending legs rotatably communicating in their rearward part with the opposed legs of a U-shaped dispenser rod rotatably communicating with the lower forward part of said dispensing tray so that upon downward movement of said activating arm said dispensing tray will move forward to partially extend without said case.

3. The invention of claim 2 further embodying a bread holding means including at least one inwardly extending, pivotably mounted dog biased to an inward position and outwardly moveable by said dispensing tray when said tray is in non-extended position, said dog being adapted to hold slices of bread thereabove out of the return path of said dispensing tray when said tray is partially extended.

References Cited

UNITED STATES PATENTS

| Number | Date | Name | Class |
|---|---|---|---|
| 785,883 | 3/1905 | Honabarger | 221—155 |
| 962,122 | 6/1910 | Brown | 312—341 X |
| 1,110,693 | 9/1914 | Jennings et al. | 221—250 |
| 1,123,075 | 12/1914 | Blythe | 221—250 |
| 1,228,799 | 6/1917 | Marcopoulos | 221—250 |
| 1,419,075 | 6/1922 | Prosser | 221—281 |
| 1,505,725 | 8/1924 | Obradovits | 221—197 |
| 3,189,216 | 6/1965 | Pinard | 221—274 |
| 3,193,139 | 7/1965 | Iannone et al. | 221—251 |

FOREIGN PATENTS

| Number | Date | Country |
|---|---|---|
| 17,596 | 7/1913 | Denmark. |
| 243,149 | 2/1912 | Germany. |
| 328,380 | 5/1930 | Great Britain. |

WALTER SOBIN, *Primary Examiner.*